April 21, 1936.  W. R. HAINSWORTH  2,037,782
REFRIGERATION
Filed April 27, 1934  6 Sheets-Sheet 1

INVENTOR.
Wm. R. Hainsworth
BY
D. E. Heath
ATTORNEY.

April 21, 1936. W. R. HAINSWORTH 2,037,782
REFRIGERATION
Filed April 27, 1934 6 Sheets-Sheet 5

INVENTOR.
BY Wm. R. Hainsworth
L. E. Heath
ATTORNEY.

Patented Apr. 21, 1936

2,037,782

UNITED STATES PATENT OFFICE 2,037,782

REFRIGERATION

William R. Hainsworth, Larchmont, N. Y., assignor, by mesne assignments, to Servel, Inc., Dover, Del., a corporation of Delaware Application April 27, 1934, Serial No. 722,640

24 Claims. (Cl. 62—119.5)

My invention relates to refrigeration and more particularly to air cooled refrigerators of the absorption type.

It is an object of my invention to provide effective natural draft cooling for the heat rejecting portions of an absorption type refrigerator. Another object is to provide an absorption type refrigerator having a condenser disposed at a high level and adequately cooled by natural draft. A further object is to provide an absorption type refrigerator having a condenser disposed at a high level below the top of the cabinet and adequately cooled by natural draft. A still further object is to provide adequate cooling for a condenser and an absorber of an absorption type refrigerator in which the condenser is directly cooled and the absorber is indirectly cooled by air.

My invention is particularly applicable to absorption refrigeration apparatus generally of the nature of that disclosed in Patent No. 1,609,334 to Von Platen et al. and more specifically in accordance with the disclosure in an application of A. R. Thomas, Serial No. 673,815, and is, in general, characterized by exposure of the heat emitting parts of the apparatus to atmospheric air, and acceleration of natural air flow with respect to such parts by maintenance of a column of relatively warm air in the path of flow of air beyond the heat emitting parts. This application relates back for common subject matter to my application, Serial No. 663,486.

The nature of my invention together with the objects and advantages thereof will be more fully understood from consideration of the following description in connection with the accompanying drawings, of which Fig. 1 is an expanded or schematic view of a refrigeration apparatus contemplated by my invention;

Figure 1:
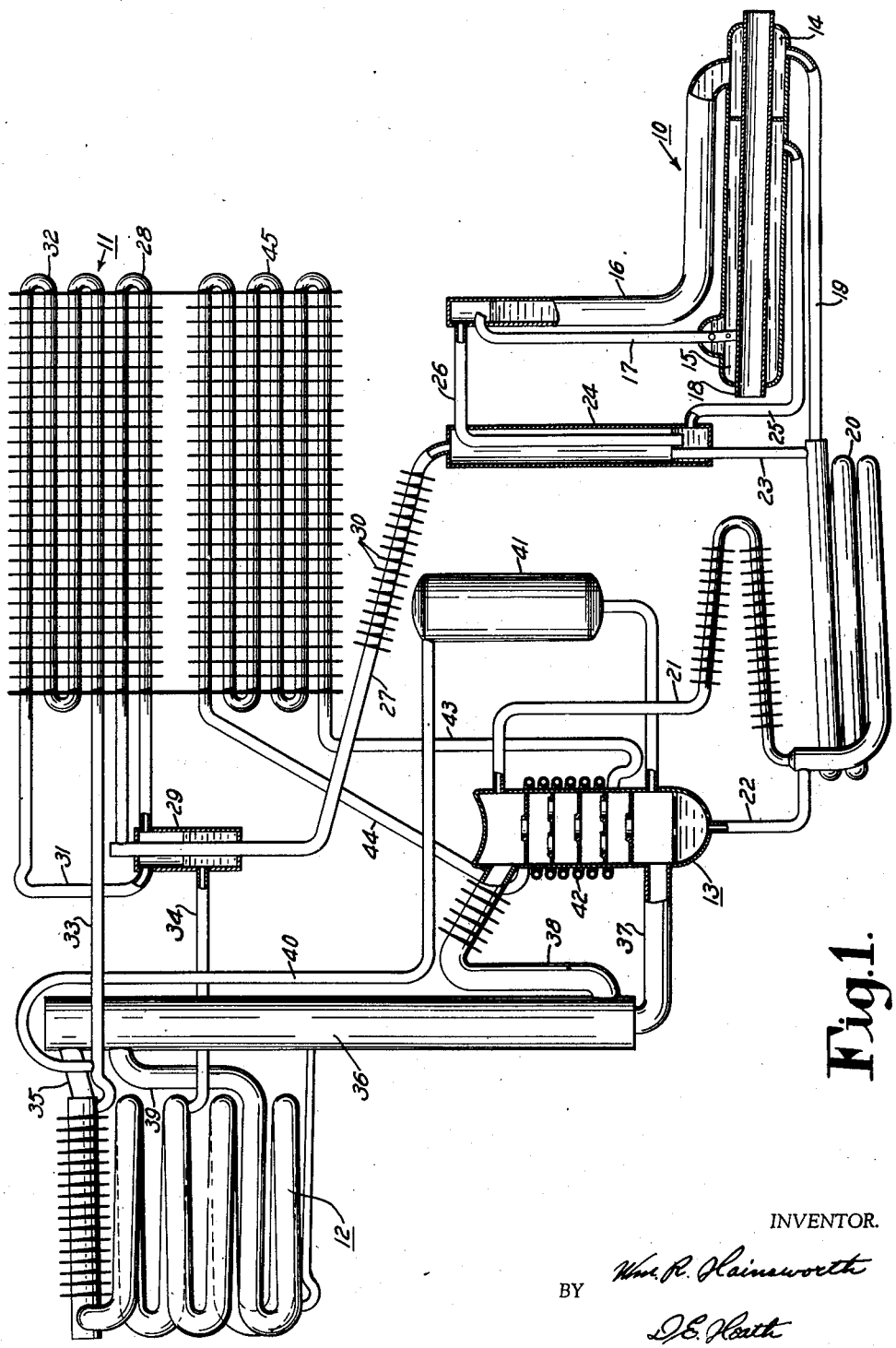

Referring to Fig. 1 of the drawings, the refrigeration apparatus illustrated includes a generator 10, a condenser 11, an evaporator or cooling element 12, and an absorber 13. The generator 10 has a substantially horizontal portion divided by a partition into what may be referred to as a weak liquid chamber 14 and a strong liquid chamber 15. A stand pipe 16 communicates at its lower end with the weak liquid chamber 14, and a thermosyphon conduit 17 is provided, opening into the strong liquid chamber 15 and connected to the upper end of the stand pipe 16, as known in the art. The generator may be heated by any suitable means as, for instance, a gas burner, not shown, arranged so that the flame is directed into the flue 18 which extends through the horizontal portion of the generator. The weak liquid chamber 14 of the generator is connected through conduit 19, a liquid heat exchanger 20, and conduit 21 to the upper part of the absorber 13. The bottom of the latter is connected through conduit 22, the liquid heat exchanger 20, and conduit 23 to an analyzer comprising a vessel 24. The lower part of the analyzer is connected through conduit 25 to the strong liquid chamber 15 of the generator.

The upper part of the generator stand pipe 16 is connected through conduit 26 to the analyzer 24, the opening of conduit 26 in the analyzer being in the lower part thereof and below the normal liquid level therein for the purpose hereinafter described. The upper part of the analyzer 24 is connected by a conduit 27 to the upper end of the lower condenser loop 28, the lower end of this loop being connected to the upper part of a vessel or jacket 29 around the upper end of conduit 27. The latter is advantageously provided with a plurality of heat radiation fins 30 between the analyzer 24 and the vessel 29. The upper part of vessel 29 is connected by conduit 31 to the upper end of the condenser coil 32, the lower end of which is connected by conduit 33 to the upper end of the evaporator 12. The lower part of vessel 29 is connected by conduit 34 to an intermediate part of the evaporator.

The upper end of the evaporator 12 is connected by conduit 35, a gas heat exchanger 36, and conduit 37 to the lower part of the absorber 13. The upper part of the latter is connected by conduit 38, gas heat exchanger 36, and conduit 39 to the lower end of the evaporator 12.

The condenser 11 is vented to the absorber 13 through a conduit 40 connected from conduit 33 to the lower part of the absorber. In conduit 40 is connected what may be termed a pressure vessel 41.

The absorber 13 is provided with a cooling coil 42 connected by conduits 43 and 44 to a condenser 45. The absorber cooling coil 42, conduits 43 and 44, and condenser 45 form a secondary heat transfer system which is charged with a suitable heat transfer fluid such as methyl chloride. Both condensers 11 and 45 are provided with heat radiation fins for air cooling as hereinafter described. Conduit 21 is also advantageously provided with heat radiation fins, as shown, for air cooling of liquid flowing through this conduit to the absorber.

The above described apparatus is charged with an inert gas as, for instance, hydrogen at a predetermined pressure, and a solution of refrigerant in a liquid absorbent, such as a water solution of ammonia. The pressure at which the hydrogen is introduced into the apparatus corresponds to the pressure at which ammonia condenses to liquid at a predetermined temperature, which is preferably a high room temperature.

The operation of this system is fully described in said application Serial No. 673,815 of A. R. Thomas, and is briefly as follows:

Ammonia vapor, expelled by heat from solution in the generator 10, flows through conduit 26 into the analyzer 24, where it bubbles upwardly through strong solution in the lower part thereof. From the upper part of the analyzer, the ammonia flows through conduit 27 to the first condenser loop 28. The finned portion 30 of conduit 27 comprises what may be termed a high temperature rectifier and the jacket 29, which receives condensate from the condenser loop 28, forms a low temperature rectifier. In these rectifiers, water condenses out of the ammonia vapor and drains back into the analyzer 24, as known in the art. Liquid ammonia, formed in the condenser loop 28, overflows from vessel 29 through conduit 34 into the lower part of the evaporator 12. Uncondensed ammonia vapor flows from the upper part of vessel 29 through conduit 31 to the further condenser coil 32. From the latter, liquid ammonia drains through conduit 33 into the upper part of the evaporator 12. The purpose of this arrangement is to maintain a constant temperature in the refrigerator with variations in room temperature and may be fully understood from consideration of the description in said Thomas application Serial No. 673,815.

In the evaporator or cooling element 12, the liquid ammonia evaporates by diffusion into the hydrogen which enters the evaporator through conduit 39. The resulting gas mixture flows from the evaporator through conduit 35, gas heat exchanger 36, and conduit 37, into the lower part of the absorber 13. In the latter, ammonia is absorbed out of the gas mixture into weak solution which enters the absorber through conduit 21. The weak gas returns from the upper part of the absorber to the evaporator through conduit 38, gas heat exchanger 36, and conduit 39. The weak solution flows to the absorber from chamber 14 of the generator through conduit 19, liquid heat exchanger 20, and conduit 21. Enriched absorption solution accumulates in the lower part of the absorber 13, from where it flows through conduit 22, liquid heat exchanger 20, and conduit 23 into the analyzer 24, where it stands substantially at the same level as in the absorber. From the analyzer, the strong solution flows through conduit 25 into chamber 15 of the generator, from where it is raised through conduit 17 by thermosyphon action into the upper part of the stand pipe 16, as known in the art.

Figure 3:
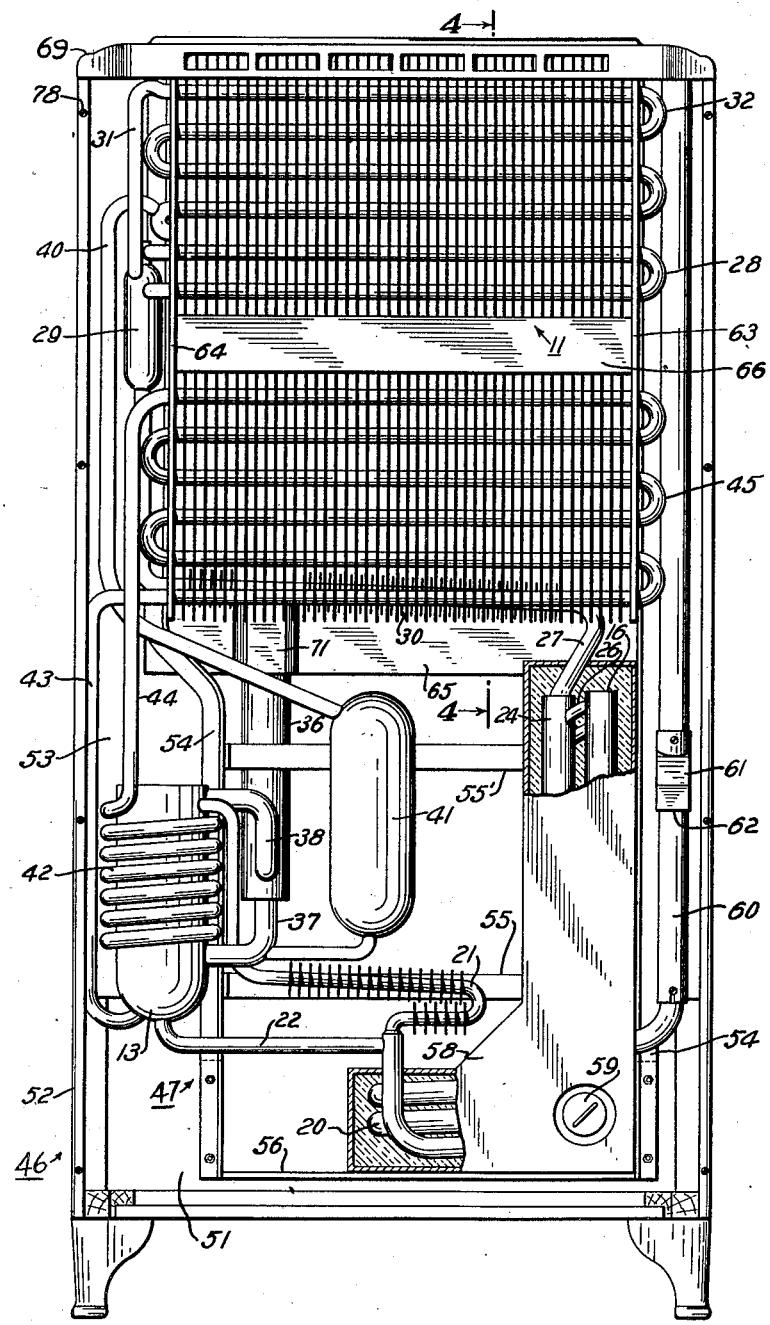
Fig. 3 is a rear view of the refrigerator cabinet with the top and apparatus unit in place.
Figure 2:
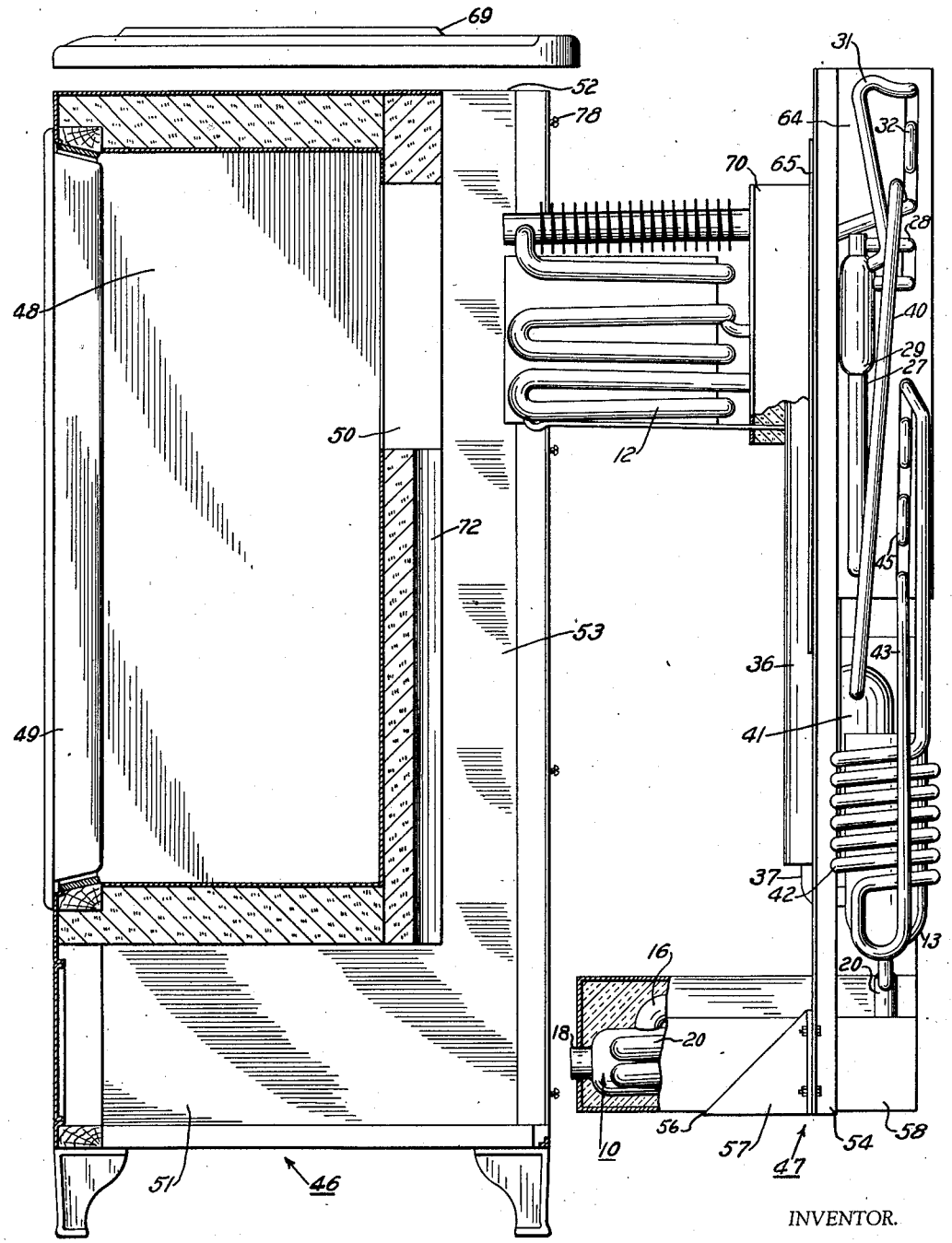
Fig. 2 shows a refrigerator comprising a cabinet, shown in vertical section, with the top of the cabinet elevated, and the refrigeration apparatus of Fig. 1 assembled as a unit and partly withdrawn from the cabinet.

Referring to Figs. 2 and 3, there is illustrated a refrigerator comprising a cabinet 46 provided with a refrigeration apparatus unit 47, which latter comprises the system described in connection with Fig. 1. The parts of the apparatus are the same in all views and accordingly indicated by the same reference numerals. In Fig. 2, the refrigerator cabinet is shown in vertical section with the top elevated, and the refrigeration apparatus unit is shown in side elevation, substantially withdrawn from the cabinet. In Fig. 3, the refrigerator is shown in rear view with the apparatus unit assembled in the cabinet.

The refrigerator cabinet 46 comprises a thermally insulated storage compartment 48 accessible by means of an insulated door 49 and provided with an aperture 50 in the rear wall. Below the storage compartment 48 there is an apparatus compartment 51, and the side walls 52 of the cabinet 46 are extended rearwardly of the storage compartment 48, forming a chamber 53 which extends upwardly from the rear of the apparatus compartment 51 to the top of the refrigerator cabinet. The latter is open both at the bottom and at the rear. The aperture 50 opens from the storage compartment 48 into the upper part of the rear apparatus chamber 53. In this refrigerator cabinet there is substantially no limitation of air circulation outside of the storage compartment 48, that is, the apparatus compartment comprising the lower chamber 51 and rear chamber 53, is, for all intents and purposes, exposed to the atmosphere.

The refrigeration apparatus is mounted on a frame comprising a pair of vertical angle irons 54 connected by cross-bars 55 and, between their lower ends, a sheet metal shelf 56. The latter is formed with integral brackets 57 at each end which are bolted or otherwise secured to the lower ends of the angle irons 54. The bottom shelf 56 supports a unit comprising the generator 10, analyzer 24, and liquid heat exchanger 20. This unit is surrounded by thermal insulating material, such as mineral wool, and provided with a light casing 58 of suitable material such as light gauge sheet metal. The front end of the generator flue 18 extends through the casing 58, as may be seen in Fig. 2, for proper location of a heating element, such as a gas burner and its associated controls, not shown. As shown in Fig. 3, the other end of the generator flue 18 is provided with a plug 59, accessible from without the casing 58 for facilitating insertion of a suitable flue cleaning device when desired. This end of the generator flue is also connected to an extension 60, also shown in Fig. 3, which terminates at the top of the refrigerator cabinet, the opening 76 in the top of the cabinet being visible in the rear perspective view in Fig. 5. The generator flue extension 60 is provided with a suitable dilution device 61 having openings, not visible in the drawings, in the bottom of a flared portion 62 to allow flow of air into the flue, which results in cooling and dilution of the flue gases before discharge at the top of the refrigerator, as known in the art.

To the upper part of the angle iron frame are secured a pair of spaced plates 63, 64, which may be referred to as side plates. Between the angle irons 54, and of a height corresponding substantially to the height of the side plates 63, 64, is mounted a thin sheet of metal 65 which may be referred to as a back plate. The ammonia condenser 11 and the secondary or methyl chloride condenser 45 are arranged one above the other with the coils thereof extending between and supported from the side plates 63, 64 near the rear edges of these plates, that is, near the edges remote from the edges secured to the angle irons 54. The heat radiation fins which extend transversely of the condenser coils are therefore parallel to the side plates 63, 64. In the space between the upper ammonia condenser 11 and the lower secondary or absorber cooling condenser 45 is a partition plate 66, secured at each end to the side plates 63, 64.

The conduit 27 connecting the analyzer 24 with the lower coil 28 of the ammonia condenser 11 extends through the lower part of the space 67 formed between the condensers 11, 45, and the back plate 65. This portion of conduit 27 is provided with the heat radiation fins 30 and has a slight slope toward the analyzer and constitutes, as previously set forth, an air cooled or high temperature rectifier.

Figure 4:
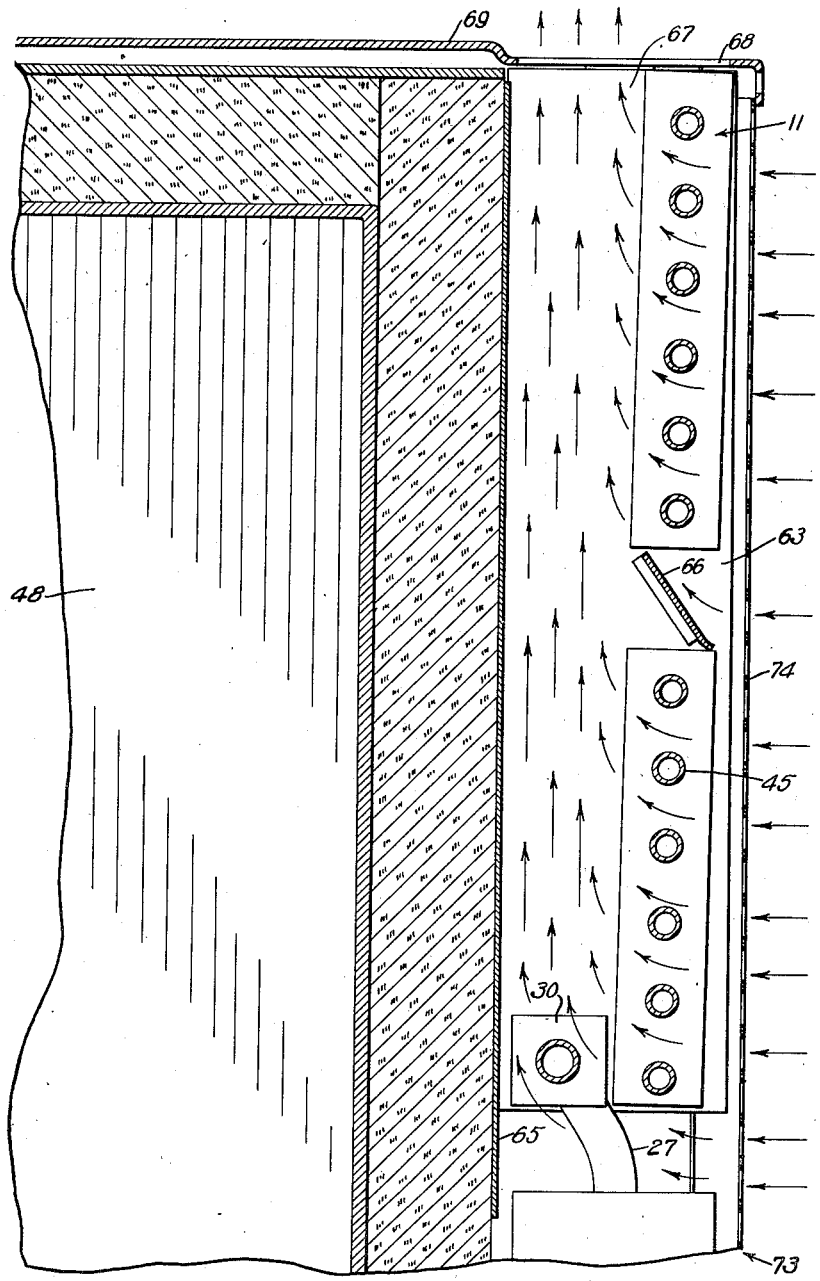
Fig. 4 is a detail section on line 4—4 of Fig. 3.

The arrangement of condensers and rectifier, which is of primary importance in this invention, will be more clearly apparent from a consideration of the detail section shown in Fig. 4. Referring to this figure, it is seen that the space 67 constitutes a flue, closed on three sides by the side plates 63, 64 and the back plate 65. The other side of the flue 67 is formed by the condensers 11, 45 and the baffle plate 66. The bottom of the flue is closed by the high temperature rectifier portion of conduit 27. The top of the flue is open, and unobstructed flow of air from the flue is provided by openings 68 in the top 69 of the refrigerator cabinet. These openings may also be observed in the rear perspective view of the cabinet shown in Fig. 5. It will now be understood that substantially all of the air which enters the flue space 67 must pass through the condensers 11, 45 or the rectifier portion of conduit 27. As indicated by the arrows in Fig. 4, air entering the flue space 67 flows between the condenser coils and between the condenser heat radiation fins and between the rectifier fins 30. The spacing of these radiation fins may be made small enough so that substantially all of the air flowing therebetween must pass in thermal contact therewith. This arrangement makes possible air cooling of the heat radiation portions of the refrigeration unit at a high efficiency without the use of a fan or other means for producing a forced draft, for not only is there secured good thermal transfer from the condensers and rectifier to the air, but there is also obtained a greater flow of air for the reason that no unheated air enters the flue space 67, and the column of air in this space is at a much higher temperature and therefore of much less weight than an equivalent column of air at the room temperature. In short, this improvement brought about by my invention is characterized by the prevention of dilution of air in the flue by the entrance of unheated air. It will be understood that the high temperature rectifier may be otherwise located and the bottom of the flue completely closed, as by another plate 30a shown in Fig. 6, or the lower end of condenser 45 may be located next to the back plate 65 to close the bottom of the flue space.

Referring again to Figs. 2 and 3, it will be seen that the other parts of the refrigeration apparatus, previously described, are mounted substantially within a narrow vertical space behind the angle irons 54, except for the evaporator 12 and the horizontal portion of the generator and liquid heat exchanger unit. On the back plate 65 is mounted a thermally insulated wall section 70, which may be referred to as a window closure. The latter is located and constructed so that it fits within and closes the aperture or window opening 50 in the rear of the refrigerator storage compartment 48 when the refrigeration apparatus unit is mounted in position in the cabinet as hereinafter described. The evaporator 12 is mounted on the front of the window closure 70 through which extend the connections from the evaporator to the other parts of the apparatus, as previously described. The gas heat exchanger 36 is located between the angle irons 54 of the unit frame, wherefore the back plate 65 is provided with a shallow recess 71, shown in Fig. 3, and a channel or recess 72 is provided in the insulation of the rear wall of the refrigerator storage compartment 48 below the window 50, as shown in Fig. 2, to receive the gas heat exchanger when the refrigeration apparatus unit is mounted in the cabinet. The recess 71 in the back plate 65 may be lined with thermal insulation so a major portion of the gas heat exchanger will be well insulated when the unit is in the cabinet.

Figure 5:
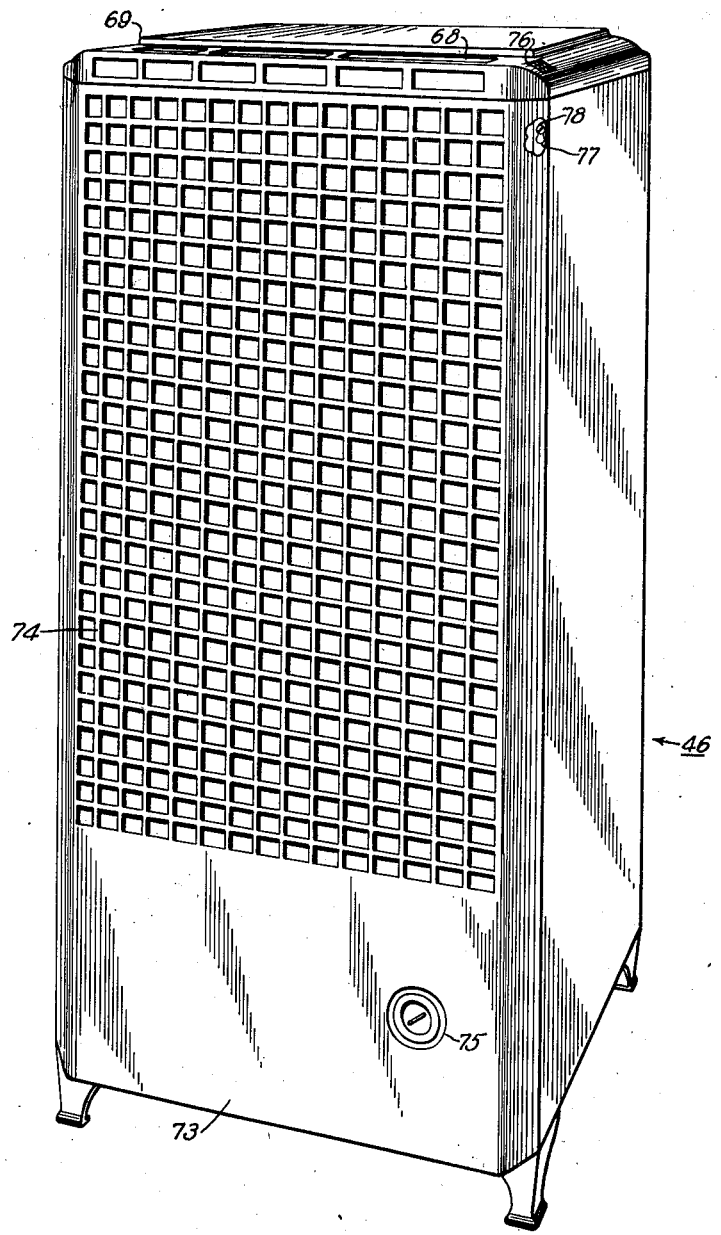
Fig. 5 is a rear perspective view of the refrigerator cabinet.
Figure 6:
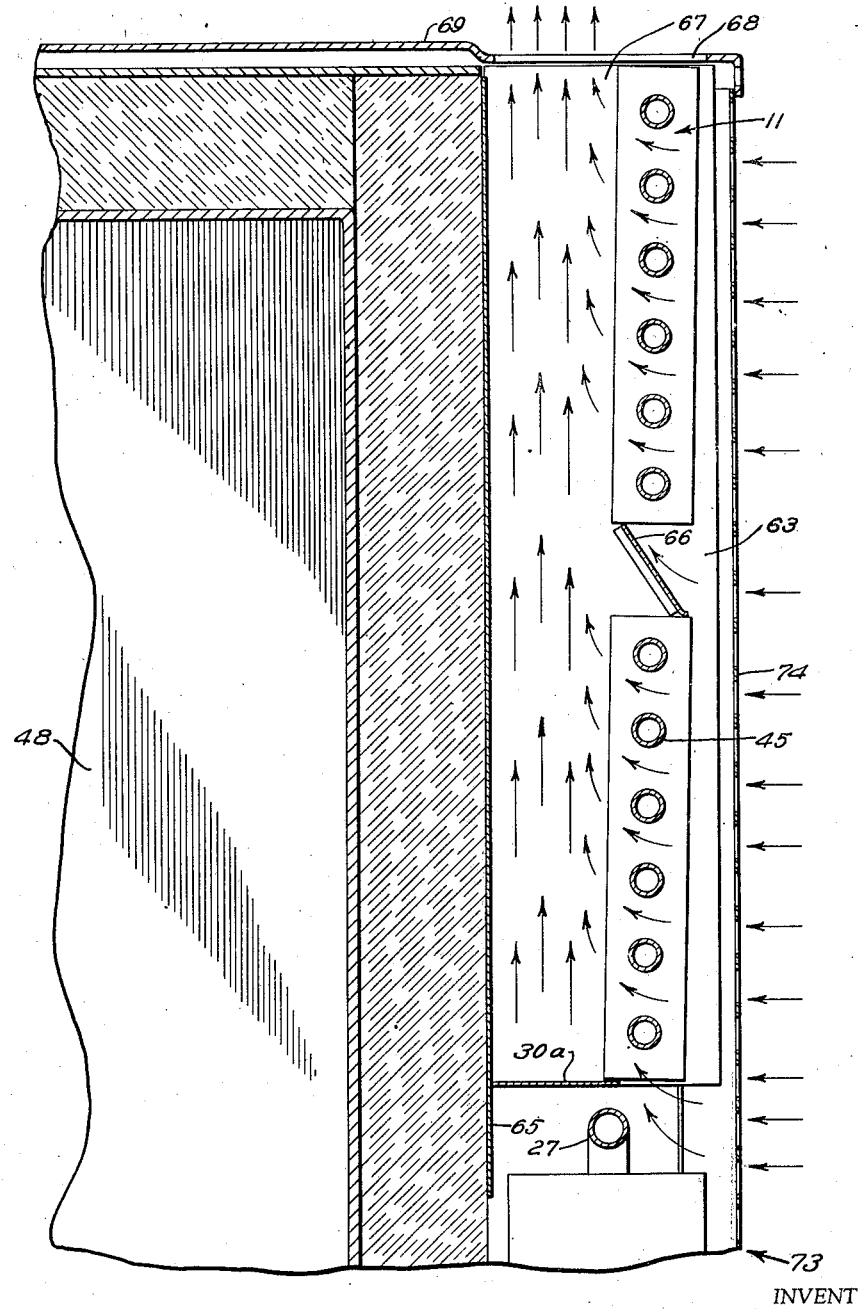
Fig. 6 is a detail section like Fig. 4 and illustrating a further embodiment of my invention.

In Fig. 5, there is shown a rear perspective view of the refrigerator cabinet provided with a rear cover plate 73 for the purpose of presenting an aesthetic appearance from the rear without sacrificing flow of air over the heat emitting portions of the refrigeration apparatus unit when the latter is mounted in place. To this end, the upper part of the cover plate 73 is formed as an open grille or screen 74. An opening 75 is provided in the lower part of the rear cover plate 73 for access to the generator flue plug 59. The rear cover plate 73 which may be referred to generally as a screen, is readily removable from the cabinet. To this end, the side edges of the screen are flanged inwardly and provided with a plurality of slots 77, each having an enlarged lower portion forming, in appearance, an inverted keyhole, as may be seen in the small cut away portion in Fig. 5. Along the rear edges of the cabinet wall is provided a corresponding plurality of slightly protruding screws 78, as may be seen in Figs. 2 and 3. To assemble the screen, it is placed against the rear of the cabinet so that the heads of the projecting screws 78 pass through the enlarged lower portions of the slots 77, and then lowered so that the screws become recessed in the narrow upper portions of the slots, whereby the screen is retained in place, the upper portions of the slots being narrower than the diameter of the heads of the screws 78. It will be understood that if it is desired to tighten the screws 78 after assembly of the screen, it will be necessary to provide openings for a screw driver in the screen opposite the slots 77.

Referring to Figs. 2 and 5, assume that the screen 73 and the top 69 are removed from the refrigerator cabinet 46. The refrigeration unit 47 may now be placed in the position shown in Fig. 2 and moved toward the cabinet 46, until the back plate 65 and angle irons 54 abut the rear wall of the storage compartment 48. The unit is then secured in this position by any suitable means, not shown, as screws, bolts provided with wing nuts, or the like. In this position the evaporator 12 is within the upper part of the refrigerator storage compartment 48, the closure member 70 fills the window opening or aperture 50, the upper part of the gas heat exchanger 36 is recessed in the channel 72, the horizontal portion of the generator and liquid heat exchanger unit is within the lower chamber 51 of the apparatus compartment, and the other parts of the apparatus are within the narrow rear chamber 53 of the apparatus compartment. The back plate 65 lies against the wall of the storage compartment 48, and it will be understood that this plate may be omitted as far as its function of closing the flue 67 is concerned. The screen 73 is next assembled on the rear of the cabinet, as previously described, and the top 69 lowered into place, thus completing the refrigerator assembly. For the purpose of replacement or repair, the cabinet and apparatus unit are disassembled in the reverse order from that of assembly just described.

Experience with refrigerators constructed as above described has disclosed the relation between the depth of the flue space 67, that is, the distance of the condenser 11 from the back plate 65, and the temperature differential of the condenser and the air. In the instance of a condenser provided with six heat radiation fines per inch and having a constant heat input of 300 calories per hour, changing the flue depth from one inch to two inches results in a decrease in temperature differential from 40° F. to 32.5° F., which is a decrease of 7.5° F. Upon further increasing the depth of the flue from two inches to three inches, the temperature differential decreased from 32.5° F. to 27° F., which is a decrease of 5.5° F. Further increase in the depth of the flue to four inches results in a decrease in temperature differential to 25° F., which is a decrease of only 2° F. Therefore, taking into consideration the conservation of cabinet space, it has been determined that the optimum flue depth or condenser spacing is three inches. It has also been determined that tilting the condenser by bringing the lower end thereof nearer to the back plate 65 does not appreciably affect the results, wherefore, to allow as much space as possible at the back of the cabinet for flow of air to the condenser, it has been found advantageous to tilt the condenser inwardly at the lower end with the upper end spaced the optimum distance of three inches from the back plate or cabinet wall, forming a flue having a maximum depth at the top of three inches. It has also been determined that the optimum spacing of the condenser radiation fins is obtained with approximately four fins per inch.

It will be obvious to those skilled in the art that various changes may be made in the construction and arrangement without departing from the spirit of the invention, and therefore the invention is not limited to what is shown in the drawings and described in the specification but only as indicated in the following claims.

I claim:

1. In a refrigerator, a cabinet having a thermally insulated storage compartment and an apparatus compartment, said apparatus compartment having a portion open to atmosphere at the top and rear of said cabinet, absorption type refrigeration apparatus including a cooling element in said storage compartment, a condenser comprising a flat pipe-coil in the upper part of the apparatus compartment and in a substantially vertical plane adjacent the open rear of said apparatus compartment and having closely spaced heat transfer fins substantially perpendicular to said plane, an absorber, means for cooling said absorber including a second condenser similar to said first condenser and located below the latter substantially in said plane thereof, imperforate wall members forming the other sides of a flue of which one side is formed by said condensers, means to prevent flow of air into said flue intermediate said condensers, a generator, a rectifier for vapor from said generator comprising a substantially horizontal conduit having closely spaced transverse heat transfer fins and located in a manner to encounter, in thermal transfer relation, all air entering the bottom of said flue, and a closure member for the rear of said cabinet including a grille opposite said condensers.

2. In a refrigerator, a cabinet including an apparatus compartment open to atmosphere at the top and at one side of the cabinet, absorption type refrigeration apparatus including a condenser comprising a flat pipe-coil in the upper part of said compartment and in a substantially vertical plane adjacent the open side of said cabinet and having closely spaced heat transfer fins substantially perpendicular to said plane, means including said condenser and substantially imperforate members completely bounding, except at the top, a flue space at one side of said condenser, and a closure member for the open side of said cabinet including a grille opposite said condenser.

3. Refrigeration apparatus of the absorption type including a condenser comprising a flat pipe-coil in a substantially vertical plane and having closely spaced heat transfer fins substantially perpendicular to said plane, and means including said condenser and substantially imperforate members completely bounding, except at the top, a flue space at one side of said condenser.

4. Absorption type refrigeration apparatus including a condenser comprising a relatively flat pipe-coil in a substantially upright plane and having heat transfer fins substantially perpendicular to said plane, an absorber, a cooling system for said absorber including a second condenser similar to said first condenser and located substantially in said plane thereof, imperforate wall members forming the other sides of a flue of which one side is formed by said condensers, means to prevent flow of air into said flue intermediate said condensers, a generator, a rectifier for vapor from said generator comprising a substantially horizontal conduit having transverse heat transfer fins and located in a manner to encounter, in thermal exchange relation, all air entering the bottom of said flue.

5. Absorption type refrigeration apparatus including a condenser disposed in a substantially upright plane and having extensive heat transfer surfaces substantially perpendicular to said plane, an absorber, means for cooling said absorber including a second condenser similar to said first condenser and located substantially in said plane thereof, means completely bounding, except at the top, a flue space of which one side is formed by said condensers, and means to prevent flow of air into said flue intermediate said condensers.

6. A condenser for absorption type refrigeration apparatus disposed in a substantially upright plane and having extensive heat transfer surfaces substantially perpendicular to said plane, and means including said condenser completely bounding, except at the top, a flue space at one side of said condenser, whereby all air entering said flue space must pass in thermal exchange relation with said condenser.

7. A condenser for absorption type refrigeration apparatus disposed in a substantially upright plane and constructed and arranged for cooling by flow of air in contact therewith and substantially perpendicular to said plane, and means including said condenser completely bounding, except at the top, a flue space at one side of said condenser, whereby all air entering said flue space must pass in thermal exchange relation with said condenser.

8. In a refrigerator, a cabinet having an apparatus compartment open to atmosphere at the top and one side of the cabinet, absorption type refrigeration apparatus including a condenser disposed in a substantially upright plane in said compartment adjacent said open side and constructed and arranged for cooling by flow of air in contact therewith and substantially perpendicular to said plane, and means including said condenser and substantially imperforate members completely bounding, except at the top, a flue space at the side of the condenser opposite said open side of the cabinet.

9. In a refrigerator, a cabinet having an apparatus compartment open to atmosphere at the top and one side of the cabinet, absorption type refrigeration apparatus including a condenser disposed in a substantially upright plane in said compartment adjacent said open side and constructed and arranged for cooling by flow of air in contact therewith and substantially perpendicular to said plane, means including said condenser and substantially imperforate members completely bounding, except at the top, a flue space of which a portion toward said open side of the cabinet is bounded by said condenser, and a closure member for the open side of said cabinet including a grille opposite said condenser.

10. Refrigeration apparatus of the absorption type including a heat rejecting portion disposed in a substantially upright plane, and constructed and arranged for cooling by flow of air in contact therewith and substantially perpendicular to said plane, and means including substantially imperforate members and said heat rejection portion completely bounding, except at the top, a flue space at one side of said heat rejecting portion.

11. In a refrigerator, a cabinet having an apparatus compartment open to atmosphere at the top and one side of said cabinet, absorption type refrigeration apparatus having a heat rejecting portion disposed in a substantially upright plane adjacent the open side of said compartment and constructed and arranged for cooling by flow of air in contact therewith and substantially perpendicular to said plane, and means including substantially imperforate members and said heat rejection portion completely bounding, except at the top, a flue space at one side of said heat rejecting portion opposite said open side of the cabinet.

12. Refrigeration apparatus of the absorption type having a plurality of heat rejecting portions, one of which is disposed in a substantially upright plane and all of which are constructed and arranged for cooling by flow of air in contact therewith and substantially perpendicular thereto, and means including said heat rejecting portions completely enclosing, except at the top, a flue space, whereby all air entering said flue must pass in thermal exchange relation with a heat rejecting portion.

13. In a refrigerator, a cabinet, absorption type refrigeration apparatus including a condenser adapted for cooling by air and horizontally spaced from an exterior wall portion of said cabinet, and means including said wall portion and said condenser for completely enclosing a flue open only at the top, whereby all air entering said flue must pass in thermal exchange relation with said condenser.

14. In a refrigerator, a cabinet, and absorption type refrigeration apparatus removable as a unit from said cabinet and including an air cooled condenser disposed in a substantially upright plane so that when said apparatus is assembled with said cabinet there is formed a flue space between said condenser and an outer wall of said cabinet, and means including said condenser for completely enclosing said flue space except at the top, whereby all air entering said flue space must pass in thermal exchange relation with said condenser.

15. Refrigeration apparatus of the absorption type including an air cooled condenser disposed in a substantially upright plane and having one side exposed to the atmosphere, and means including said condenser for completely enclosing, except at the top, a space on the other side of said condenser to form a flue into which air may flow only in thermal exchange relation with said condenser.

16. In a refrigerator, a cabinet having a thermally insulated storage compartment and an apparatus compartment, said apparatus compartment having a portion open to atmosphere at the top and rear of said cabinet, absorption type refrigeration apparatus including a cooling element in said storage compartment, an air cooled condenser disposed in a substantially upright plane adjacent the open rear of said apparatus compartment, an absorber, a cooling system for said absorber including a second condenser similar to said first condenser and disposed substantially in said plane thereof, means completely enclosing the other sides of a flue of which one side is formed by said condensers, means to prevent flow of air into said flue intermediate said condensers, and an air cooled rectifier disposed in a manner to encounter in thermal transfer relation, all air entering the bottom of said flue.

17. In an absorption type refrigerator, a cabinet having a vertical insulating wall, a condenser exposed to atmospheric air and spaced from said wall to form a space, said space receiving air through said condenser and constituting a flue, and means for excluding unheated air from said flue.

18. In an absorption type refrigerator, a cabinet having a vertical insulating wall, a condenser spaced from said wall, members including said condenser and wall forming a substantially vertical flue at one side of and coextensive in height with said condenser and completely closed except at the side formed by the condenser and at the top.

19. In a refrigeration apparatus of the absorption type, a first condenser, a generator connected to supply refrigerant vapor to said condenser, an absorber, means for cooling said absorber including a second condenser, said condensers being disposed one above the other, and members forming with said condensers a natural draft flue substantially coextensive in height with said condensers.

20. In an absorption type refrigerator, a cabinet having an upright insulating wall, a condenser spaced from said wall a distance of approximately three inches and means including said wall and said condenser forming a natural draft flue substantially coextensive in height with said condenser and completely closed except at the side formed by the condenser and at the top.

21. In an absorption type refrigerator, an upright wall, a first condenser, a generator connected to supply refrigerant vapor to said condenser, an absorber, means for cooling said absorber including a second condenser, said condensers being disposed one above the other and spaced from said wall a distance of approximately three inches, and members forming with said condensers and said wall a natural draft flue substantially coextensive in height with said condensers.

22. In an absorption type refrigerator, an upright wall, a first condenser comprising a flat pipe coil having approximately four transverse heat transfer fins per inch, an absorber, means for cooling said absorber including a second condenser similar to said first condenser, said condensers being disposed one above the other substantially in the same plane and spaced from said wall, and members forming with said wall and condensers a natural draft flue substantially coextensive in height with said condensers, the space between said condensers and said wall being a maximum of approximately three inches at the top of said flue.

23. In an absorption type refrigerator, an upright wall, a condenser comprising a flat pipe coil having transverse heat radiation fins and horizontally spaced from said wall in a plane inclined downwardly toward said wall, and members forming with said condenser and said wall a natural draft flue substantially coextensive in height with said condenser.

24. In a refrigerator, a cabinet having a vertical wall, a condenser formed of pipe disposed in substantially a vertical plane and spaced from said vertical wall a distance appreciably greater than the diameter of said pipe, members substantially closing certain sides of the space between the condenser and vertical wall against flow of unheated air therethrough while allowing flow of air through the condenser to form a natural draft flue open at the top and receiving air through the condenser, said condenser as a whole being constructed and arranged to allow a wide horizontal free area of air flow upwardly through the flue, and apparatus connected to said condenser for forming a refrigerant circuit.

WILLIAM R. HAINSWORTH.